(12) United States Patent
Krucinski et al.

(10) Patent No.: US 11,465,517 B2
(45) Date of Patent: Oct. 11, 2022

(54) ELECTRIC CHARGING CONNECTION FOR HEAVY VEHICLES

(71) Applicant: ABB Schweiz AG, Baden (CH)

(72) Inventors: Martin Krucinski, Glastonbury, CT (US); Gregory Cole, West Hartford, CT (US)

(73) Assignee: ABB SCHWEIZ AG, Baden (CH)

( * ) Notice: Subject to any disclaimer, the term of this patent is extended or adjusted under 35 U.S.C. 154(b) by 723 days.

(21) Appl. No.: 16/414,348

(22) Filed: May 16, 2019

(65) Prior Publication Data

US 2020/0361326 A1  Nov. 19, 2020

(51) Int. Cl.
*B60L 53/16* (2019.01)
*B60L 53/66* (2019.01)
*B60L 50/50* (2019.01)

(52) U.S. Cl.
CPC ............... *B60L 53/16* (2019.02); *B60L 50/50* (2019.02); *B60L 53/66* (2019.02)

(58) Field of Classification Search
CPC ................................. B60L 53/16; B60L 53/50
See application file for complete search history.

(56) References Cited

U.S. PATENT DOCUMENTS

| | | | | |
|---|---|---|---|---|
| 5,584,712 A * | 12/1996 | Fukushima | ........... | B60L 3/0069 439/140 |
| 5,921,803 A * | 7/1999 | Mori | ..................... | H02J 7/0045 439/387 |
| 9,365,128 B2 | 6/2016 | Sarkar et al. | | |
| 9,895,987 B2 | 2/2018 | Uchiyama et al. | | |
| 9,950,635 B1 | 4/2018 | Trego | | |
| 9,975,440 B1 | 5/2018 | Song et al. | | |
| 9,987,939 B2 | 6/2018 | Shah | | |
| 10,014,615 B2 | 7/2018 | Mueller et al. | | |
| 10,017,062 B2 | 7/2018 | Kufner et al. | | |
| 10,071,645 B2 | 9/2018 | Chai et al. | | |
| 10,081,333 B2 | 9/2018 | Kim | | |
| 10,106,109 B2 | 10/2018 | Kawai et al. | | |
| 10,227,018 B2 | 3/2019 | Heuer et al. | | |
| 2002/0081486 A1 * | 6/2002 | Williams | ................ | B60L 53/18 180/68.5 |
| 2011/0207368 A1 * | 8/2011 | Takada | ..................... | B60L 53/16 439/519 |
| 2012/0266914 A1 * | 10/2012 | Van Dyke | ................. | B08B 3/02 15/210.1 |
| 2014/0235089 A1 * | 8/2014 | Nakajima | ............... | B60L 50/66 439/350 |
| 2017/0136907 A1 | 5/2017 | Ricci | | |

\* cited by examiner

*Primary Examiner* — David V Henze-Gongola

(74) *Attorney, Agent, or Firm* — Greenberg Traurig, LLP

(57) ABSTRACT

A charging connection is provided for charging electric vehicles. The first connector is coupled to an electric charging station with an electric cable. The second connector is coupled to the electric vehicle. The first connector has at least two openings slide onto at least two posts of the second connector. When the first and second connectors are coupled together, an electric potential supplies power from the first connector to the second connector.

18 Claims, 5 Drawing Sheets

ELECTRIC CHARGING CONNECTION FOR HEAVY VEHICLES

BACKGROUND

It is expected that the use of electric vehicles will increase substantially in the years ahead. One particular area of interest is electrically powered heavy vehicles like freight trucks. In order for electric freight trucks to be more commonly used, it will be necessary to develop electric charging stations and electrical connectors for coupling a charging station to an electric freight truck. Such systems have unique concerns due to the larger power requirements that will be needed to charge heavy vehicles like freight trucks. For example, compared to smaller vehicles like a passenger car, the electric charging cables and connectors will need to be much larger to accommodate the higher power requirements. This means the hardware will be heavier and harder to handle by an operator. The increased electric power must also be handled in a safe manner to prevent harm to the operator.

SUMMARY

A charging connection is described for coupling an electric charging station to a heavy vehicle like a freight truck. The charging connection has a first connector associated with the charging station and a second connector associated with the vehicle. The first connector has openings with conductive inner surfaces that contact conductive outer surfaces of posts in the second connector. In order to couple the first and second connectors together, the openings of the first connector may be slid onto the posts of the second connector.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
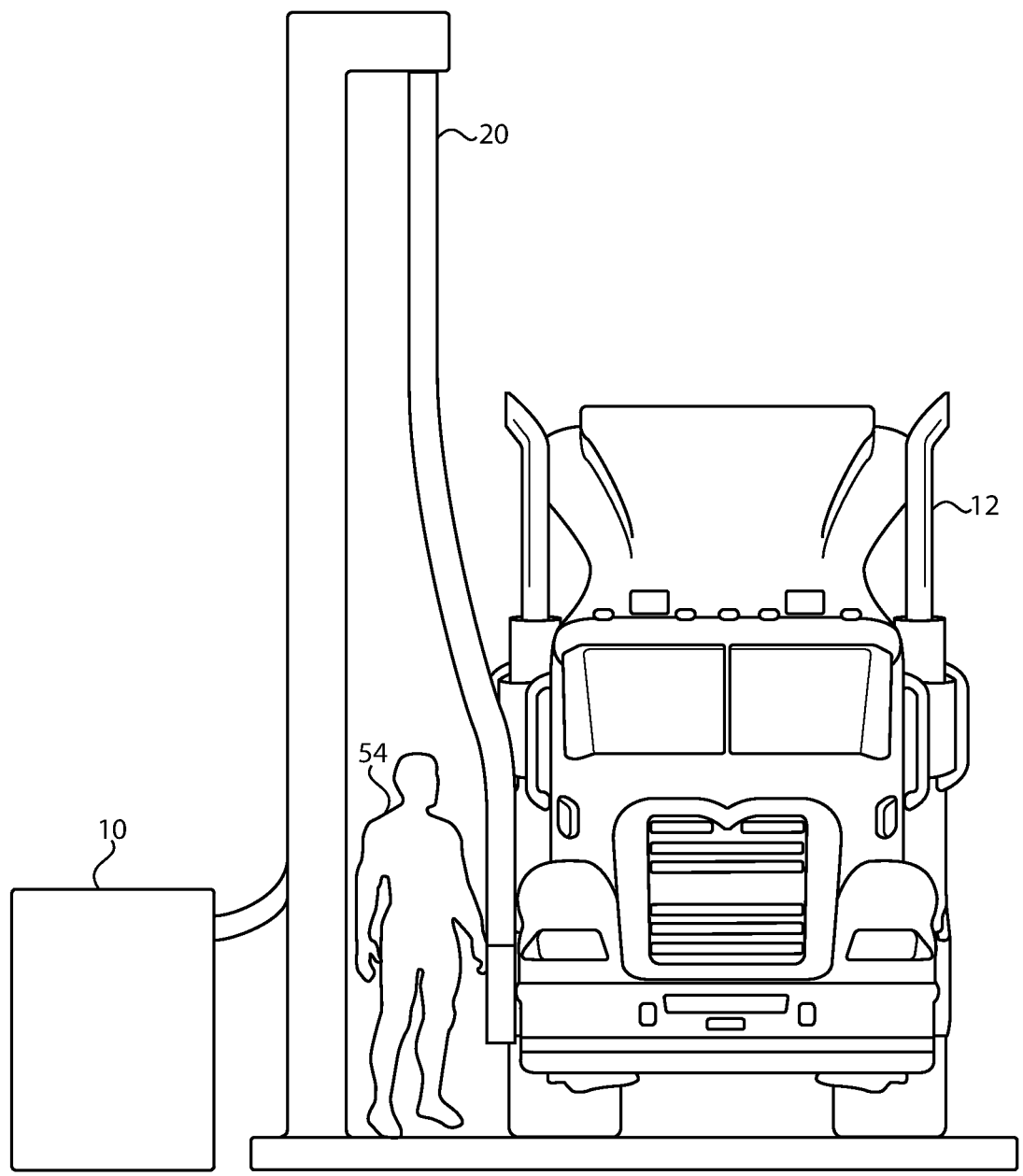
FIG. 1 is a front view of an electrical charging station and a freight truck.

As illustrated in FIGS. 1-4, an electric charging station 10 may be provided to supply electric power to heavy vehicles 12, such as freight trucks 10. The charging connection between the electric charging station 10 and the vehicle 12 may include a first connector 14 coupled to the electric charging station 10. The first connector 14 may include at least two openings 16 extending through at least a portion of the first connector 14. Each of the openings 16 includes a conductive inner surface 18 therein, such as copper, aluminum, silver or alloys thereof. Each of the openings 16 (i.e., conductive inner surface 18) is coupled to an electric cable 20 extending between the electric charging station 10 and the first connector 14. The electric cables 20 provide an electrical potential to the conductive inner surfaces 18 to provide charging power to the vehicle 12.

The second connector 22 is coupled to the vehicle 12. The second connector 22 may include at least two posts 24. Each of the posts 24 includes a conductive outer surface 26 thereon, such as copper, aluminum, silver or alloys thereof. The electric vehicle 12 is preferably charged with DC power such that one opening 16 and corresponding post 24 is connected to the positive side and one opening 16 and post 24 is connected to the negative side. Preferably, the first and second connectors 14, 22 also include a third opening 16 and a corresponding third post 24 for a protective earth connection.

In use, the first connector 14 slides onto the second connector 22 to make electrical contact between the electric charging station 10 and the vehicle 12 such that the openings 16 of the first connector 14 slide onto the posts 24 of the second connector 22. When the first and second connectors 14, 22 are coupled together, the electrical potential is supplied from the conductive inner surfaces 18 of the openings 16 to the conductive outer surfaces 26 of the posts 24 to transfer electric power from the charging station 10 to the vehicle 12.

Figure 6:
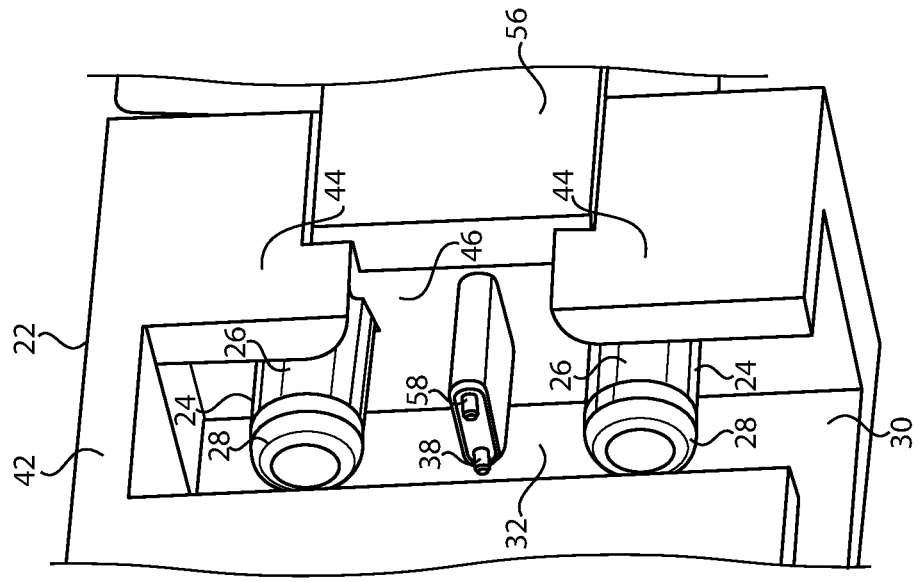
FIG. 6 is a perspective view of one embodiment of the second connector.
Figure 5:
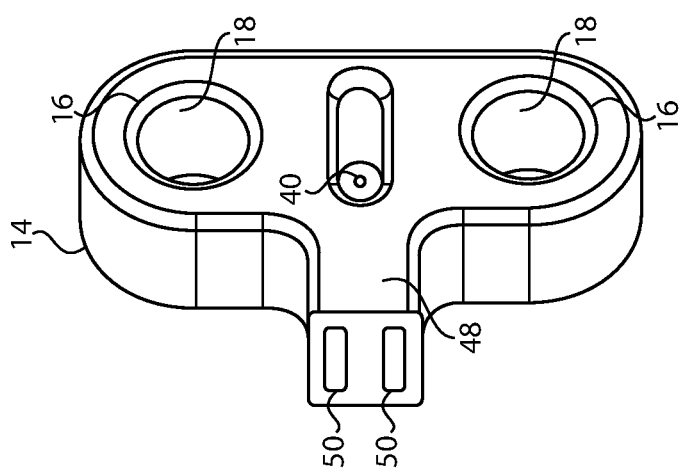
FIG. 5 is a perspective view of one embodiment of the first connector.

As illustrated in FIGS. 5-6, each of openings 16 may extend completely through the first connector 14. Each of the posts 24 may also include a tip 28 that fully extends through each respective opening 16 when the first and second connectors 14, 22 are coupled together. As a result, any debris that may be inside of the openings 16 is pushed out of the openings 16 by the tips 28 of the posts 24 when the first connector 14 is slid onto the second connector 22. Preferably, each of the tips 28 may be made of a flexible material (e.g., plastic). The tips 28 may also be oversized with respect to each respective opening 16 such that the tips 28 are squeezed through the respective openings 16 as the first connector 14 is coupled to the second connector 22. This further helps to push debris out of the openings 16 and cleans the conductive inner surface 18 of each opening 16. As illustrated in FIG. 6, the vehicle 12 may also have a space 30 below the tips 28 of the posts 24 to receive any debris pushed out of the openings 16. Preferably, the space 30 is an exposed opening 30 that allows the debris to drop to the ground.

Figure 2:
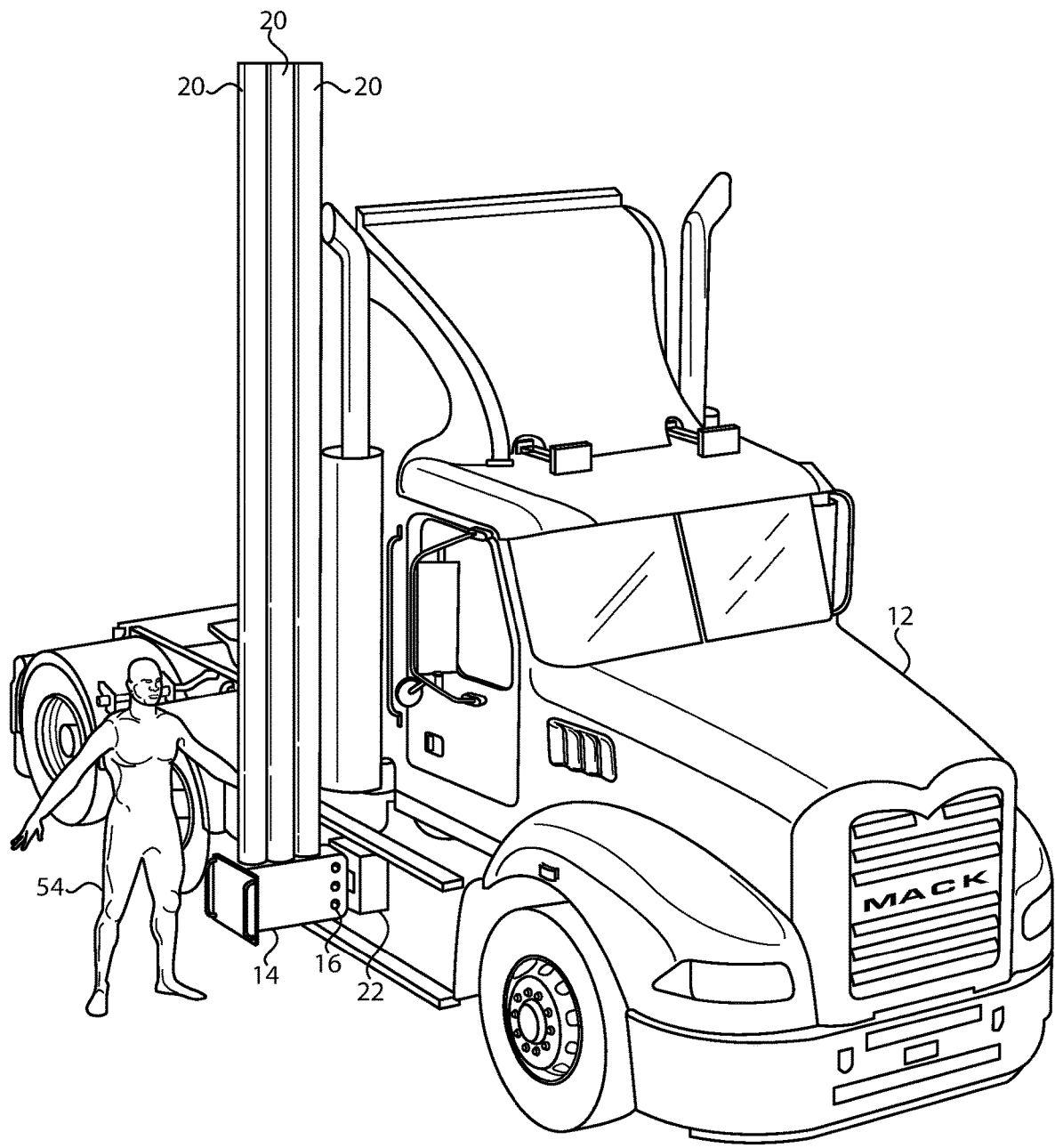
FIG. 2 is a perspective view of a lateral side of the truck, showing electric cables of the charging station hanging next to the truck.
Figure 8:
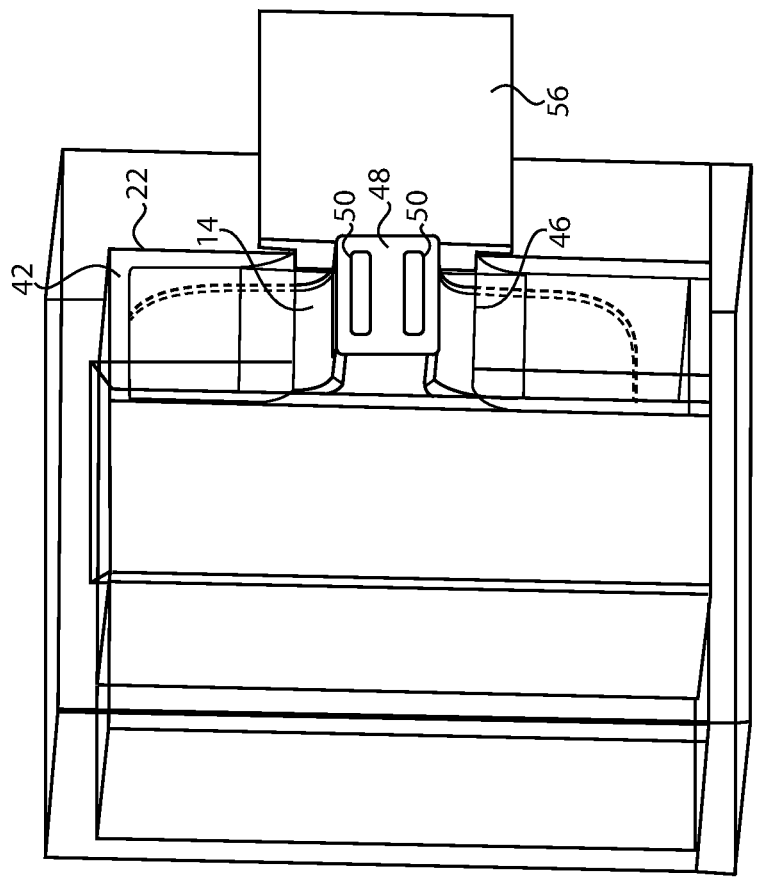
FIG. 8 is a perspective view of the first and second connectors coupled together.

Due to the large size needed for the first and second connectors 14, 22 and the large weight thereof, it will be undesirable to provide the first and second connectors 14, 22 along the bottom underside of the vehicle 12 as is sometimes done with passenger vehicles. Instead, as illustrated in FIG. 2, the second connector 22 is provided on a lateral side of the truck 12 and the first connector connects along the side of the truck 12. As illustrated in FIG. 6, the vehicle 12 may be provided with an access opening 32 through which the first connector 14 is inserted to couple the first and second connectors 14, 22 together (FIG. 8). Preferably, as noted, the access opening 32 is disposed on the lateral side of the vehicle 12 as opposed to the underside of the vehicle 12. It is also preferable for the posts 24 to extend horizontally and be arranged vertically with respect to each other. The posts 24 may be fixed and non-moving with respect to the vehicle 12, if desired, such that the first connector 14 is movable relative to the vehicle 12 and the second connector 22 in order to accomplish the coupling of the first and second connectors 14, 22.

Figure 3:
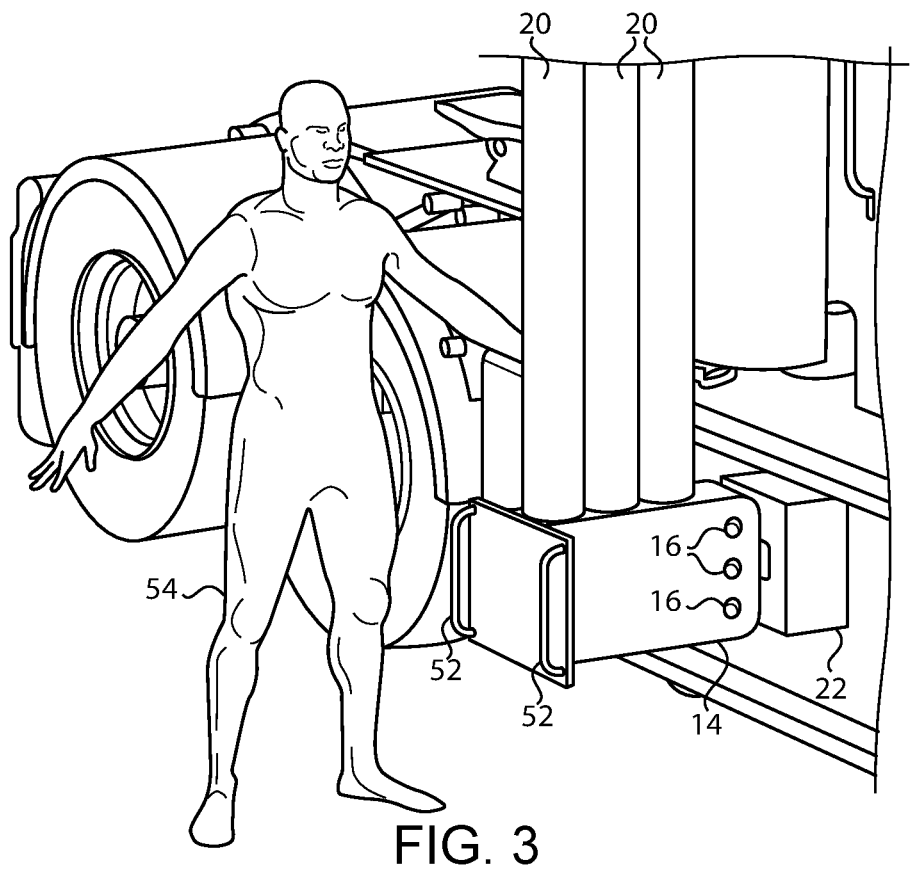
FIG. 3 is a close perspective view of the lateral side of the truck, showing a first connector of the charging station and a second connector of the truck.
Figure 4:
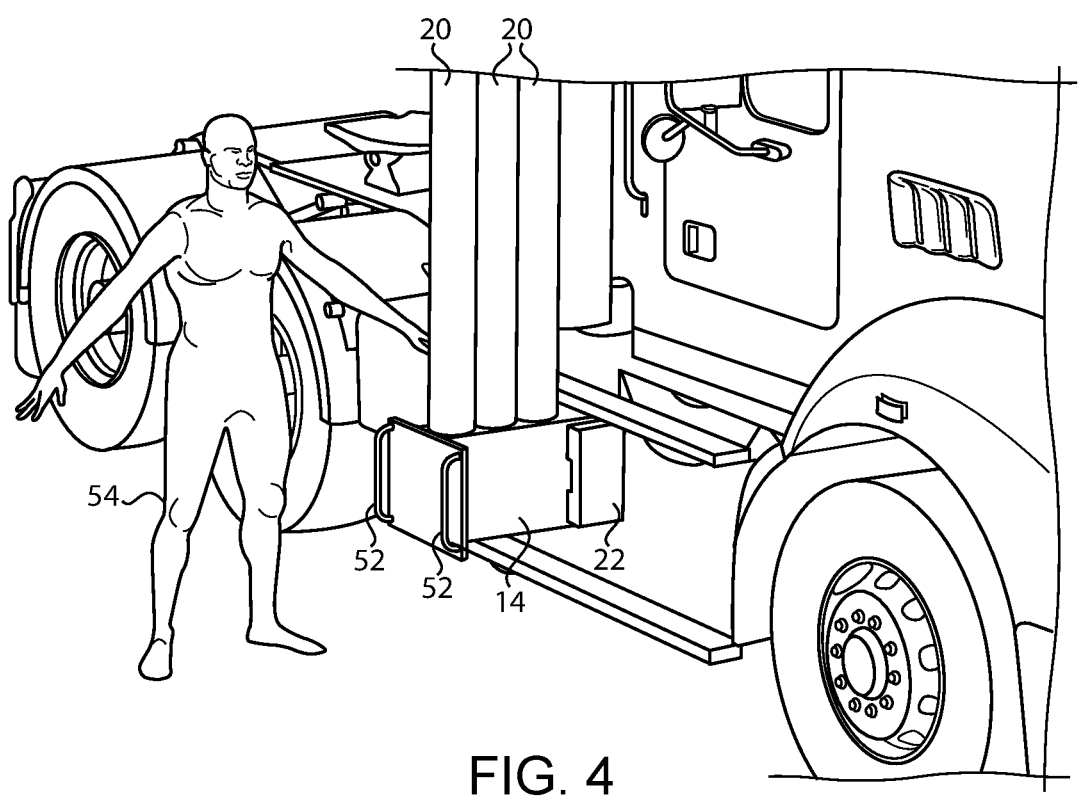
FIG. 4 is a close perspective view of the lateral side of the truck, showing the first and second connectors coupled together.

Due to the high power requirements needed to charge heavy vehicles like freight trucks, the charging station 10, cables 20 and first and second connectors 14, 22 must be capable of transferring high electric power. For example, where the vehicle 12 is a freight truck 12, the electrical potential preferably supplies at least 150 kW, and more preferably at least 1.5 mW of power from the electric charging station 10 to the freight truck 12. It may also be desirably to supply as much as 8 mW of electric power. In order to handle the increased power requirements, the posts 24 and the openings 16 preferably have a diameter of at least 10 mm, more preferably at least 30 mm, and most preferably at least 50 mm. In order to provide sufficient insulation between the posts 24, the posts 24 are also preferably spaced apart from each other by at least 6 mm, more preferably at least 30 mm, and most preferably at least 50 mm. Also, in view of the size and weight of the first connector 14, it may be preferable for the electric cables 20 to hang down vertically and for the first connector 14 to be attached at the bottom of the electric cables 20 such that the first connector 14 is hanging from the cables 20. Thus, the cables 20 can hold the weight of the first connector 14 instead of the operator 54 needing to lift and carry the first connector 14. As illustrated in FIG. 3, it may be desirable for the first connector 14 to have a pair of handles 52 for the human operator 54 to engage the first connector 14 with the second connector 22.

Figure 7:
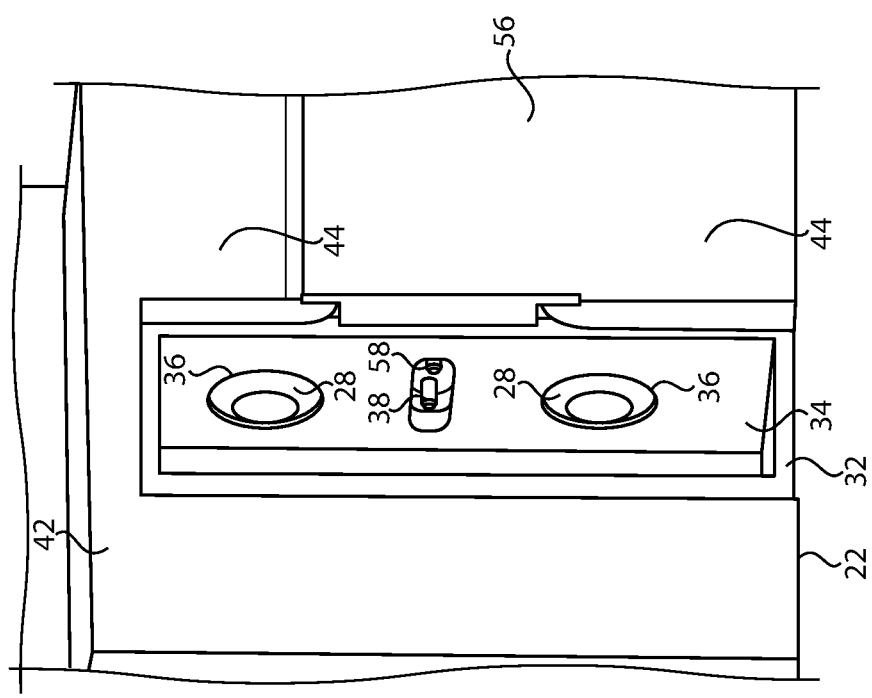
FIG. 7 is a perspective view of the second connector, showing a cover preventing inadvertent contact with the conductive surfaces of the second connector.

As illustrated in FIG. 6, each of the posts 24 may have a tip 28 made of an electrically insulating material, such as plastic. As illustrated in FIG. 7, it may be desirable for the second connector 22 to be provided with a cover 34 with holes 36 corresponding to each of the posts 24. The holes 36 may circumscribe the insulated tips 28 when the first connector 14 is not coupled to the second connector 22. Thus, the conductive outer surfaces 26 of the posts 24 may be obstructed by the tips 28 and the cover 34 to prevent inadvertent contact by the operator 54 with the conductive outer surfaces 26 of the posts 24. The vehicle 12 may also have a housing 42 for the second connector 22 with portions 44 of the housing 42 that cover the lateral sides of the posts 24. The housing 42 may also have an opening 46 between the portions 44 through which a neck 48 of the first connector 14 slides as the first connector 14 is slid onto the second connector 22. A door 56 may be provided to cover the opening 46 when the first connector 14 is not coupled to the second connector 22. The door 56 may slide or swing away when the neck 48 of the first connector 14 moves through the opening 46. Electrical conductors 50 may extend through the neck 48 to connect the conductive inner surfaces 18 to the electric cables 20.

As illustrated in FIG. 6, the second connector 22 may also include a power pilot 38, or signal pin 38. When the first and second connectors 14, 22 are coupled together, the power pilot 38 becomes coupled to a corresponding contact 40 on the first connector 14. The power pilot 38 and contact 40 may be sized and placed such that the electrical potential is only supplied when the power pilot 38 is coupled to the corresponding contact 40. In particular, the power pilot 38 and the corresponding contact 40 are only coupled after the conductive inner surfaces 18 of the openings 16 contact the corresponding conductive outer surfaces 26 of the posts 24. As a result, electric arcing between the openings 16 and the posts 24 is prevented when the first connector 14 is slid onto and off of the second connector 22 since electric power is only supplied after the conductive surfaces 18, 26 are in contact with each other. A communications pilot 58 (also a signal pin 58) may also be provided for data transmission between the charging station 10 and the vehicle 12 after the first and second connectors 14, 22 are coupled together.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A charging connection between an electric charging station and a vehicle, comprising:
   a first connector coupled to the electric charging station, the first connector comprising at least two openings extending through at least a portion of the first connector, each of the openings comprising a conductive inner surface therein, wherein each of the openings is coupled to an electric cable extending between the electric charging station and the first connector, the electric cables providing an electrical potential to the conductive inner surfaces; and
   a second connector coupled to the vehicle, the second connector comprising at least two posts, each of the posts comprising a conductive outer surface thereon;
   wherein each of the posts comprise a tip made of an electrically insulating material;
   wherein the first connector slides onto the second connector to make electrical contact between the electric charging station and the vehicle such that the at least two openings of the first connector slide onto the at least two posts of the second connector, the electrical potential thereby being supplied from the conductive inner surfaces of the openings to the conductive outer surfaces of the posts;
   wherein the second connector further comprises a cover with holes corresponding to each of the posts, the holes circumscribing the tips when the first connector is not coupled to the second connector such that the conductive outer surfaces of the posts are obstructed by the tips and the cover to prevent inadvertent contact with the conductive outer surfaces.

2. The charging connection according to claim 1, wherein each of openings extends through the first connector, and each of the posts comprise a tip that fully extends through each respective opening when the first and second connectors are coupled together such that debris within the openings is pushed out of the openings by the tips of the posts.

3. The charging connection according to claim 2, wherein each of the tips is made of a flexible material and is oversized with respect to each respective opening such that the tips are squeezed through the respective openings as the first connector is coupled to the second connector.

4. The charging connection according to claim 2, wherein the vehicle comprises a space below the tips of the posts to receive the debris.

5. The charging connection according to claim 4, wherein the space is an opening that allows the debris to drop to the ground.

6. The charging connection according to claim 1, wherein the at least two posts extend horizontally.

7. The charging connection according to claim 6, wherein the at least two posts are arranged vertically with respect to each other.

8. The charging connection according to claim 1, wherein the vehicle comprises an access opening through which the first connector is inserted to couple the first and second connectors together, the access opening being disposed on a lateral side of the vehicle.

9. The charging connection according to claim 1, wherein the posts are fixed and non-moving with respect to the vehicle.

10. The charging connection according to claim 1, wherein the at least two openings and the at least two posts comprise a positive opening and post and a negative opening and post for a DC electrical potential.

11. The charging connection according to claim 1, further comprising a third opening in the first connector and a corresponding third post in the second connector, the third opening and third post comprising a protective earth connection.

12. The charging connection according to claim 1, wherein the second connector further comprises a signal pin, the signal pin being coupled to a corresponding contact when the first and second connectors are coupled together, the electrical potential only being supplied when the signal pin is coupled to the corresponding contact, and the signal pin and the corresponding contact are only coupled after the conductive inner surfaces of the openings contact the corresponding conductive outer surfaces of the posts, electric arcing between the openings and the posts thereby being prevented as the first connector is slid onto and off of the second connector.

13. The charging connection according to claim 1, wherein the vehicle comprises a housing with portions that cover lateral sides of the posts, the housing comprising an opening between the portions through which a neck of the first connector slides as the first connector is slid onto the second connector, electrical conductors extending through the neck and connecting the conductive inner surfaces to the electric cables.

14. The charging connection according to claim 1, wherein the vehicle is a freight truck and the electrical potential supplies at least 150 kW of power from the electric charging station to the freight truck.

15. The charging connection according to claim 14, wherein the posts and the openings each have a diameter of at least 10 mm.

16. The charging connection according to claim 15, wherein each of the posts is spaced apart from each other by at least 6 mm.

17. The charging connection according to claim 1, wherein the first connector comprises a handle for a human operator to engage the first connector with the second connector.

18. The charging connection according to claim 1, wherein the electric cables extend vertically with the first connector being at a bottom of the electric cables.

* * * * *